United States Patent Office 2,881,088
Patented Apr. 7, 1959

2,881,088

FIRE RETARDANT COMPOSITION AND METHOD OF COATING THEREWITH

Wilhelm Schulenburg, Frankfurt am Main, Germany, assignor to Alim Corporation, New York, N.Y.

No Drawing. Application March 22, 1956
Serial No. 573,076

9 Claims. (Cl. 117—33)

The present invention relates to an improved fire retardant composition and method of protecting materials against fire.

It has long been known to apply protective agents, either by impregnation or coating, to combustible materials, such as wood, cellulosic wall board, paper, cardboard and the like, or to incombustible materials, such as metal or gypsum, to protect them against the heat of a flame. Known protective compositions, for example, are mixtures of resins, carbonific or carbon forming agents, such as, for instance, starch or proteinaceous materials, for example, glue, and foam forming substances, such as phosphoric and boric acids or their salts. Particularly advantageous mixtures of this kind contain 50 to 80% of foam forming substances, for example, ammonium phosphate, 10 to 50% of a urea formaldehyde resin formed from urea and formaldehyde or formaldehyde yielding substances, such as hexamethylene tetramine, and 3 to 50% of carbohydrates or proteinaceous material. Compositions of this nature are disclosed in Jones et al. U. S. Patents Nos. 2,452,054 and 2,523,626. When exposed to a flame, such fire protective or retardant compositions form a continuous coherent porous carbon containing foam which provides a heat insulating effect.

It is an object of the present invention to provide an improved fire protective or retardant composition of the above mentioned type, namely, essentially composed of a resin component, an organic non-resinous carbon forming component, such as a carbohydrate or proteinaceous material, and an inorganic foam forming agent.

According to the invention, it has unexpectedly been found that fire protective or retardant compositions of the three component type indicated above can be substantially improved by replacing all or a part of the urea-formaldehyde resin component by a urea-formaldehyde-acrolein resin. When exposed to a flame, the presence of the urea-formaldehyde-acrolein resin causes the formation of a particularly fine-pored carbon layer which has a non-peeling impervious surface and combustible articles coated with such composition are protected against combustion upon exposure to a flame for longer periods than articles protected with compositions in which the resin component is only a ureaformaldehyde resin. Furthermore, the presence of the urea-formaldehyde-acrolein resin in the compositions according to the invention improves the flexibility of the coatings produced and furthermore increases their resistance to water. Preferably, the resin component of the fire retardant or protective composition according to the invention is composed of a mixture of 40–60% of urea-formaldehyde resin and 60–40% of urea-formaldehyde-acrolein resin. However, a resin component composed only of urea-formaldehyde-acrolein resin is also within the purview of the invention, as such compositions still afford better protection against fire than compositions containing a resin component only composed of a urea-formaldehyde resin. Suitable urea-formaldehyde-acrolein resins for the composition according to the invention are, for example, shown in German Patents Nos. 748,842, 802,846 and 833,707. A particularly suitable urea-formaldehyde-acrolein resin is one in which the molar proportions of urea, formaldehyde and acrolein is 1:2.0–2.5:0.12. Preferably, the molar ratio of urea to total formaldehyde is about 1:2.6.

The urea formaldehyde resins employed in the compositions according to the invention preferably are those produced by condensing a source of formaldehyde in a ratio between 1 and 2.5 moles of formaldehyde per mole of urea.

As the foam forming inorganic component, the following can, for example, be employed with advantage in the compositions according to the invention: mono-ammonium phosphate, diammonium phosphate, phosphoric acid, ammonium sulfate, sulfamic acid, ammonium sulfamate, ammonium bromide, sodium tungstate, sodium borate and boric acid.

The third essential component of the composition according to the invention, which is of carbohydrate or proteinaceous nature, is such that it is converted to carbon in the composition rather than volatilized at elevated temperatures. Suitable carbohydrates and proteinaceous materials for the purposes of the invention include starch, modified starches, dextrin, gum tragacanth, flour (which contains both carbohydrate and protein), solid polyhydric alcohols, such as mannitol or glucosamine, glue, casein, gelatin and the like.

The preferred proportions of the three essential components of the composition according to the invention are 50 to 80 parts by weight of the foam forming component, 10 to 50 parts by weight of the carbon forming component and 3 to 50 parts by weight of the synthetic resin component.

The compositions according to the invention, in addition to the three essential components indicated above, may of course contain diluents or inert fillers, such as asbestos powder, titanium white, barium sulphate or kieselguhr.

The compositions according to the invention can be made in the form of a solid, a liquid or a paste. For ease of application, it is generally convenient to apply them to the surfaces to be treated as a solution or suspension or emulsified in a liquid medium. Water is generally the cheapest suitable material. Drying oil paint vehicles or other non-aqueous vehicles may also be employed.

The fire protective compositions according to the invention can be produced and applied in various ways. For example, the inorganic foaming agent and the carbohydrate or proteinaceous material can be dispersed in a solution or suspension of the resin component. Such mixtures can be applied in the same manner as usual painting compositions and adhere firmly to the surface to be protected after the solvent has evaporated. In place of the urea-formaldehyde-acrolein resin, the components thereof can be employed in the non-condensed or partially condensed condition.

Alternately, a suspension of the carbohydrate or proteinaceous material and the inorganic foaming agent, which may if desired contain small quantities of the resin component, can be applied to the surface to be protected and after drying a further coating of a solution containing the urea-formaldehyde-acrolein resin component can be applied thereover.

It is also possible to grind the resin component to a fine powder and mix it with the other components in powder form. The resulting mixture can then, for example, be suspended in water and be applied by spraying or brushing.

It is furthermore possible, for example, first to impregnate or coat the object or surfaces to be protected with a solution of the resin component and applying the other components while the surface is still wet with such solution to give a firmly adhering coating.

The following examples illustrate several modifications of the fire protecting agents according to the invention:

*Example 1*

200 grams of urea-formaldehyde resin and 170 grams of urea-formaldehyde-acrolein resin were ground to a particle size corresponding to a screen of 1,600 meshes per cm.$^2$ and then mixed with 484 grams of monoammonium phosphate, 20 grams of calcium phosphate, 76 grams of soluble starch and 50 grams of asbestos powder, all of the same particle size. This mixture upon admixture with water provided an excellent protective coating after painting upon the surface to be protected and drying.

The urea-formaldehyde resin employed was produced as follows: 35 kg. of disodium phosphate were dissolved in 812 kg. of 30% formaldehyde (243 kg. formaldehyde) with adjustment of the pH to 8.2 and 243 kg. of urea were added to such solution. The resulting mixture was stirred for about 4–5 hours while maintaining a temperature up to about 40° C. and then allowed to stand over night. The resulting thick mass was then heated to about 55° C. and the water content thereof reduced to 5–10% under a vacuum of 80–100 mm. Hg. As the water evaporates, the temperature is gradually raised to about 120° C. The resulting semi-dried product was then put into aluminum pans which were placed in a drying oven maintained at 103° C. under a vacuum of 100 mm. Hg for 24 hours. The originally tough mass rose similarly to a cake dough and a coarsely porous frangible product resulted which was easy to remove from the pans and grind.

The urea-formaldehyde-acrolein employed was produced as follows: 17.76 kg. of urea, 4.43 liters of distilled water and 0.30 kg. of glacial acetic acid were mixed and heated to 50° C. Upon reaching this temperature, 2 kg. of acrolein were added over a period of 5–6 minutes at a rate that the temperature of the mixture did not exceed 58° C. After the acrolein had been added, the mixture was heated to 70° C. for 30 minutes and then cooled to 45° C. The product obtained was a yellowish thinly viscous precondensate.

At the same time, 55.43 kg. of 30% formaldehyde, 4.35 kg. of hexamethylene tetramine and 15.55 liters of distilled water were mixed in another vessel and the resulting solution mixed with the precondensate after it had been cooled to 45° C. The resulting mixture was heated in 10 minutes to 90° C. and maintained at this temperature for 30 minutes and then cooled to 20° C. and the pH adjusted with NaOH to 7.2.

The resulting urea-formaldehyde-acrolein resin solution was then dried under vacuum.

*Example 2*

200 grams of the urea-formaldehyde produced and ground according to Example 1 were thoroughly mixed with 460 grams of monoammonium phosphate, 40 grams of diammonium phosphate, 40 grams of magnesium phosphate, 40 grams of cereal or legume flour and 40 grams of asbestos flour, all of a particle size corresponding to a screen of 1,600 meshes per cm.$^2$. This mixture was then mixed with an aqueous urea-formaldehyde-acrolein solution (containing 170 grams of resin) obtained as described in Example 1 before drying, just before use as a protective coating composition.

*Example 3*

200 grams of urea-formaldehyde resin and 150 grams of urea-formaldehyde-acrolein produced as described in Example 1 were ground with 480 grams of monoammonium phosphate, 24 grams of boric acid, 75 grams of pea flour, 25 grams of gum tragacanth and 50 grams of asbestos flour to a particle size corresponding to a screen of 1,600 meshes per cm.$^2$.

In order to compare the properties of fire protective agents according to the invention containing a urea-formaldehyde-acrolein resin with a fire protective agent containing only a urea-formaldehyde resin as the resin component, the following tests were carried out.

In each instance the fire protective agent was an aqueous suspension of solids composed of 67% of monoammonium phosphate, 8% starch and 25% resin. The urea-formaldehyde resin employed and the urea-formaldehyde-acrolein resin employed were prepared according to Example 1. In the first test the resin component was the urea-formaldehyde resin, in the second test the resin component was a mixture of equal parts of urea-formaldehyde resin and urea-formaldehyde-acrolein resin. Plywood sheets of 5 mm. thickness were coated with these mixtures to give a coating with 300 grams of solid substance per square meter. After drying, the plywood sheets were held horizontally with the coated side lowermost and each was exposed to the flame of a Bunsen burner under exactly the same conditions. The temperature on the upper side of each sheet was measured with a thermoelectric element. The tests were discontinued when the sheet in question burned through. The results obtained are given in the following table:

| Time, minutes | 100% urea-formaldehyde resin, ° C. | 50% urea-formaldehyde resin–50% urea-formaldehyde-acrolein resin, ° C. | 100% urea-formaldehyde-acrolein resin, ° C. |
|---|---|---|---|
| 5 | 78 | 80 | 82 |
| 10 | 118 | 120 | 122 |
| 15 | 145 | 140 | 142 |
| 20 | 154 | 147 | 145 |
| 25 | 160 | 148 | 148 |
| 30 | 169 | 151 | 150 |
| 35 | 190 | 154 | 153 |
| 40 | [1] 210 | 154 | 155 |
| 45 | -------- | 159 | 157 |
| 50 | -------- | 162 | 165 |
| 55 | -------- | 164 | 179 |
| 60 | -------- | 169 | [1] 205 |
| 65 | -------- | [1] 204 | -------- |

[1] Burnt through.

I claim:
1. A fire retardant composition comprising a mixture of 50 to 80 parts by weight of a foam forming component selected from the group consisting of monoammonium phosphate, diammonium phosphate, phosphoric acid ammonium sulfate, sulfamic acid, ammonium sulfamate, ammonium bromide, sodium tungstate, sodium borate and boric acid, 10 to 50 parts by weight of a carbon forming component selected from the group consisting of starch, dextrin, gum tragacanth, flour, mannitol, glucosamine, glue, casein and gelatine and 3 to 50 parts by weight of a synthetic resin component comprising a urea-formaldehyde-acrolein resin in which the proportion of the urea component, formaldehyde component and acrolein component is about 2.0–2.5 moles of formaldehyde component, 0.12 mole of acrolein component per mole of urea component.

2. A fire retardant composition according to claim 1 in which said synthetic resin component consists of a mixture of a urea-formaldehyde resin in which the proportion of the urea component and formaldehyde component is between 1 and 2.5 moles of formaldehyde per mole of urea and said urea-formaldehyde-acrolein resin.

3. A fire retardant composition according to claim 1 in which said synthetic resin component consists of a mixture of 40 to 60% of a urea-formaldehyde resin in which the proportion of the urea component and formaldehyde component is between 1 and 2.5 moles of formaldehyde per mole of urea and 40 to 60% of said urea-formaldehyde-acrolein resin.

4. A fire retardant composition comprising a mixture of 50 to 80 parts by weight of a foam forming component selected from the group consisting of monoammonium phosphate, diammonium phosphate, phosphoric acid ammonium sulfate, sulfamic acid, ammonium sulfamate, ammonium bromide, sodium tungstate, sodium borate and boric acid, 10 to 50 parts by weight of a carbon forming component selected from the group consisting of starch, dextrin, gum tragacanth, flour, mannitol, glucosamine, glue, casein and gelatine, 3 to 50 parts by weight of a synthetic resin component comprising a urea-formaldehyde-acrolein resin in which the proportion of the urea component, formaldehyde component and acrolein component is about 2.0–2.5 moles of formaldehyde component, 0.12 mole of acrolein component per mole of urea component and water.

5. A fire retardant composition according to claim 4 in which said resin component is dissolved in water.

6. A fire retardant composition according to claim 4 in which said resin component is in finely comminuted solid form and is suspended in said water.

7. A method of protecting an article against fire which comprises applying to said article a mixture of 50 to 80 parts by weight of a foam forming component selected from the group consisting of monoammonium phosphate, diammonium phosphate, phosphoric acid ammonium sulfate, sulfamic acid, ammonium sulfamate, ammonium bromide, sodium tungstate, sodium borate and boric acid, 10 to 50 parts by weight of a carbon forming component selected from the group consisting of starch, dextrin, gum tragacanth, flour, mannitol, glucosamine, glue, casein and gelatine and 3 to 50 parts by weight of a synthetic resin component comprising a urea-formaldehyde-acrolein resin in which the proportion of the urea component, formaldehyde component and acrolein component is about 2.0–2.5 moles of formaldehyde component, 0.12 mole of acrolein component per mole of urea component.

8. A method of protecting an article against fire which comprises applying to said article an aqueous suspension containing 50 to 80 parts by weight of a foam forming component selected from the group consisting of monoammonium phosphate, diammonium phosphate, phosphoric acid ammonium sulfate, sulfamic acid, ammonium sulfamate, ammonium bromide, sodium tungstate, sodium borate and boric acid, 10 to 50 parts by weight of a carbon forming agent selected from the group consisting of starch, dextrin, gum tragacanth, flour, mannitol, glucosamine, glue, casein and gelatine, drying the applied suspension and then applying a solution containing 3 to 50 parts by weight of a urea-formaldehyde-acrolein resin in which the proportion of the urea component, formaldehyde component and acrolein component is about 2.0–2.5 moles of formaldehyde component, 0.12 mole of acrolein component per mole of urea component to such article.

9. A method of protecting an article against fire which comprises applying a solution containing 3 to 50 parts by weight of a urea-formaldehyde-acrolein resin in which the proportion of the urea component, formaldehyde component and acrolein component is about 2.0–2.5 moles of formaldehyde component, 0.12 mole of acrolein component per mole of urea component to such article and applying a finely divided solid mixture of 50 to 80 parts by weight of a foam forming component selected from the group consisting of monoammonium phosphate, diammonium phosphate, phosphoric acid ammonium sulfate, sulfamic acid, ammonium sulfamate, ammonium bromide, sodium tungstate, sodium borate and boric acid and 10 to 50 parts by weight of a carbon forming component selected from the group consisting of starch, dextrin, gum tragacanth, flour, mannitol, glucosamine, glue, casein and gelatine to such article while still wet with such solution.

References Cited in the file of this patent

UNITED STATES PATENTS

| | | |
|---|---|---|
| 2,321,451 | Bauer | June 8, 1943 |
| 2,331,377 | D'Alelio | Oct. 12, 1943 |
| 2,523,626 | Jones et al. | Sept. 26, 1950 |

FOREIGN PATENTS

| | | |
|---|---|---|
| 802,846 | Germany | Jan. 11, 1951 |